(12) United States Patent
Minami

(10) Patent No.: US 10,687,215 B2
(45) Date of Patent: *Jun. 16, 2020

(54) AUTHENTICATION SYSTEM, RECORDING MEDIUM HAVING RECORDED THEREIN COMPUTER PROGRAM CONTROLLING AUTHENTICATION SYSTEM, AND READER FOR USE IN AUTHENTICATION SYSTEM

(71) Applicant: KONICA MINOLTA, INC., Chiyoda-ku, Tokyo (JP)

(72) Inventor: Keita Minami, Amagasaki (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/015,343

(22) Filed: Jun. 22, 2018

(65) Prior Publication Data

US 2018/0324587 A1 Nov. 8, 2018

Related U.S. Application Data

(63) Continuation of application No. 15/080,717, filed on Mar. 25, 2016, now Pat. No. 10,028,140.

(51) Int. Cl.
*G06F 21/44* (2013.01)
*H04L 29/06* (2006.01)
*H04W 12/06* (2009.01)

(52) U.S. Cl.
CPC ......... *H04W 12/06* (2013.01); *H04L 63/0853* (2013.01)

(58) Field of Classification Search
CPC ............. H04L 9/32; G06F 21/44; G06F 21/30
See application file for complete search history.

(56) References Cited

U.S. PATENT DOCUMENTS 5,698,837 A 12/1997 Furuta
6,199,120 B1 3/2001 Tanaka
(Continued)

FOREIGN PATENT DOCUMENTS

JP H08-123919 A 5/1996
JP H09-171545 A 6/1997

*Primary Examiner* — Izunna Okeke
(74) *Attorney, Agent, or Firm* — Buchanan Ingersoll & Rooney PC

(57) ABSTRACT

An authentication system includes: a reading unit that (i) reads ID information as a response to a first read command being a command to which only a first type of contactless communication terminal responds, and outputs the ID information and type information indicating that a contactless communication terminal is of the first type, and (ii) reads ID information as a response to a second read command being a command to which both the first and second types of contactless communication terminals respond, and causes additional issuance of the first read command, and when succeeding in reading ID information as a response to the additionally issued first read command, outputs the ID information and type information indicating the first type; an authentication unit that, when a user list includes an output pair of ID information and type information of the communicating contactless communication terminal, authenticates a user associated with output pair.

8 Claims, 8 Drawing Sheets

(56) References Cited

U.S. PATENT DOCUMENTS

2008/0129450 A1\* 6/2008 Riegebauer .......... G06Q 20/341
　　　　　　　　　　　　　　　　　　　　340/5.86
2010/0224682 A1\* 9/2010 Busch-Sorensen ..........................
　　　　　　　　　　　　　　　　　　　　H04L 9/3278
　　　　　　　　　　　　　　　　　　　　235/380

\* cited by examiner

| User Number | Terminal type | ID | Number of sheets |
|---|---|---|---|
| 001 | NFC | 01021 | 10 |
| 002 | NFC | 02303 | 8 |
| ... | ... | ... | ... |
| 100 | IC card | 10280 | 14 |

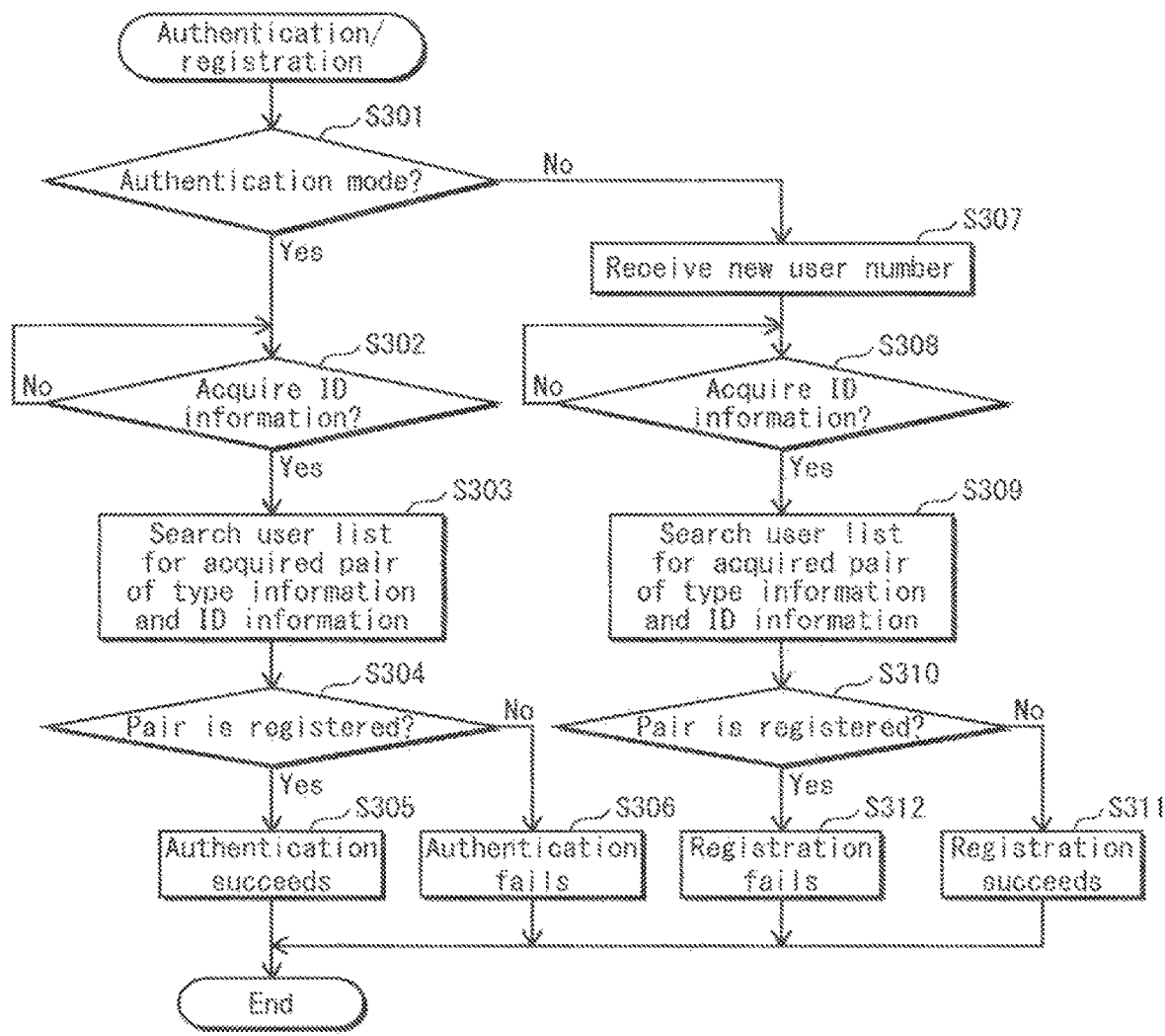

ized)# AUTHENTICATION SYSTEM, RECORDING MEDIUM HAVING RECORDED THEREIN COMPUTER PROGRAM CONTROLLING AUTHENTICATION SYSTEM, AND READER FOR USE IN AUTHENTICATION SYSTEM This application is based on an application No. 2015-065845 filed in Japan, the contents of which are hereby incorporated by reference.

BACKGROUND OF THE INVENTION

(1) Field of the Invention

The present invention relates to a user authentication technology based on ID information read from a contactless communication terminal.

(1) Description of Related Art

There has been known a user authentication technology with use of contactless communication terminals compliant with the proximity radio frequency identification (RFID) standard such as ISO/IEC 14443 Type A, ISO/IEC 14443 Type B, and Felica. Hereinafter, the proximity RFID standard is referred to collectively as the IC card standard, and contactless communication terminals compliant with the IC card standard are referred to as IC cards. Such a user authentication technology often uses ID information of IC cards for association with users.

For example, IC cards compliant with ISO/IEC 14443 Type A have ID information called UID, and IC cards compliant with Felica have ID information called IDm. When a user holds such an IC card over a card reader, the card reader reads ID information from the IC card, and thus to use the ID information of the IC card for user authentication.

Recently, there has become increasingly widespread mobile terminals that are utilizable as proximity contactless communication terminals and mount therein a near field communication (NFC) controller compliant with ISO/IEC 18092 and ISO/IEC 21481 (hereinafter, referred to as the NFC standard). Hereinafter, such mobile terminals are referred to as NFC terminals. The NFC standard is forward compatible with ISO/IEC 14443 Type A and Felica. When being in the card emulation mode in which ID information is readable from an NFC terminal by a card reader similarly to IC cards, the NFC terminal is used for user authentication similarly to IC cards.

Also, some NFC terminals implement the host-based card emulation (HCE) function. According, to the HCE function, there is no need for hardware-based secure elements dedicated for the card emulation mode, and an NFC application executed by a CPU of an NFC terminal emulates an IC card. The card emulation mode by the HCE function is easily implemented in this way, and accordingly is expected to be used extensively.

SUMMARY OF THE INVENTION

According to the HCE function, however, it is necessary for example to designate an NFC application that the card reader should access because of a possibility that ID information differs between NFC applications. For this reason, a read command for reading ID information of an NFC application from an NFC terminal that uses the HCE function (hereinafter, referred to as a read command N) differs from a read command for reading ID information compliant with the IC card standard from an IC card (hereinafter, referred to as a read command I). Accordingly, in order to make available for both NFC terminals and IC cards in the authentication system, it is for example necessary for the card reader to alternately issue the read command N and the read command I.

However, since the NFC terminals are forward compatible with the IC cards, the NFC terminals respond to not only the read command N but also the read command I. As a result, when an NFC terminal is held over the card reader in accordance with a timing when the card reader issues the read command I, the authentication system might misidentify that a contactless communication terminal held over the card reader is not an NFC terminal but an IC card. This results in failure in user authentication due to the use of ID information and type of the contactless communication terminal that are correlated with each other.

Japanese Patent Application Publication No. H09-171545 discloses a technology of identifying a plurality of types of IC cards, which are manufactured by different card manufacturers, by storing information of a card manufacturer on each of the IC cards and reading the information of the card manufacturer by a card reader. However, NFC terminals and IC cards have already been widespread, it is not realistic to newly add information indicating the type of contactless communication terminal to each of these contactless communication terminals.

The present invention was made in view of the above problem, and aims to provide an authentication system that reads ID information from each of a plurality of types of contactless communication terminals that respond to different read commands, and performs user authentication based on type of the contactless communication terminal and the ID information without misidentifying the type of a contactless communication terminal that is compatible with a read command for reading ID information from another type of contactless communication terminal, a recording medium having recorded therein a computer program, that controls the authentication system, and a reader for use in the authentication system.

In order to achieve the above aim, an authentication system that reads ID information from a contactless communication terminal by repeatedly issuing a first read command and a second read command until receiving a response to either read command, and performs user authentication based on the ID information, the first read command being a command to which only a first type of contactless communication terminal responds, the second read command being a command to which both the first type of contactless communication terminal and a second type of contactless communication terminal respond, the authentication system comprising: a communication unit configured to communicate with a contactless communication terminal to issue read commands and receive a response to any of the read commands; a reading unit configured to (i) read ID information as a response to the first read command via the communication unit, and then output the ID information and type information indicating that the contactless communication terminal communicating with the communication unit is of the first type, and (ii) read ID information as a response to the second read command via the communication unit, and then cause the communication unit to additionally issue the first read command, and when succeeding in reading ID information as a response to the additionally issued first read command via the communication unit, output the ID information and type information indicating that the communicating contactless communication terminal is of the first type; a storage that stores therein a user list in which a pair of ID information and type information of a contactless communication terminal is registered in association with each user; and an authentication unit configured to search the user list for a pair of the ID information and the type information of the communicating contactless communication terminal output by the reading unit, and when the output pair is included in the user list, authenticate a user who is associated with the output pair.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 3A shows that a read command I for ID information compliant with an IC card standard is received, FIG. 3B shows that a read command N for ID information attached to an NFC application is received, and FIG. 3C shows that a read command N is sent to a CPU while the CPU is busy;

FIG. 9 is a flow chart showing authentication/registration processing performed by an authentication unit.

DESCRIPTION OF EMBODIMENT

The following explains an embodiment of an authentication system relating to the present invention, with reference to the drawings.

Embodiment

<Hardware Configuration>

Figure 1:
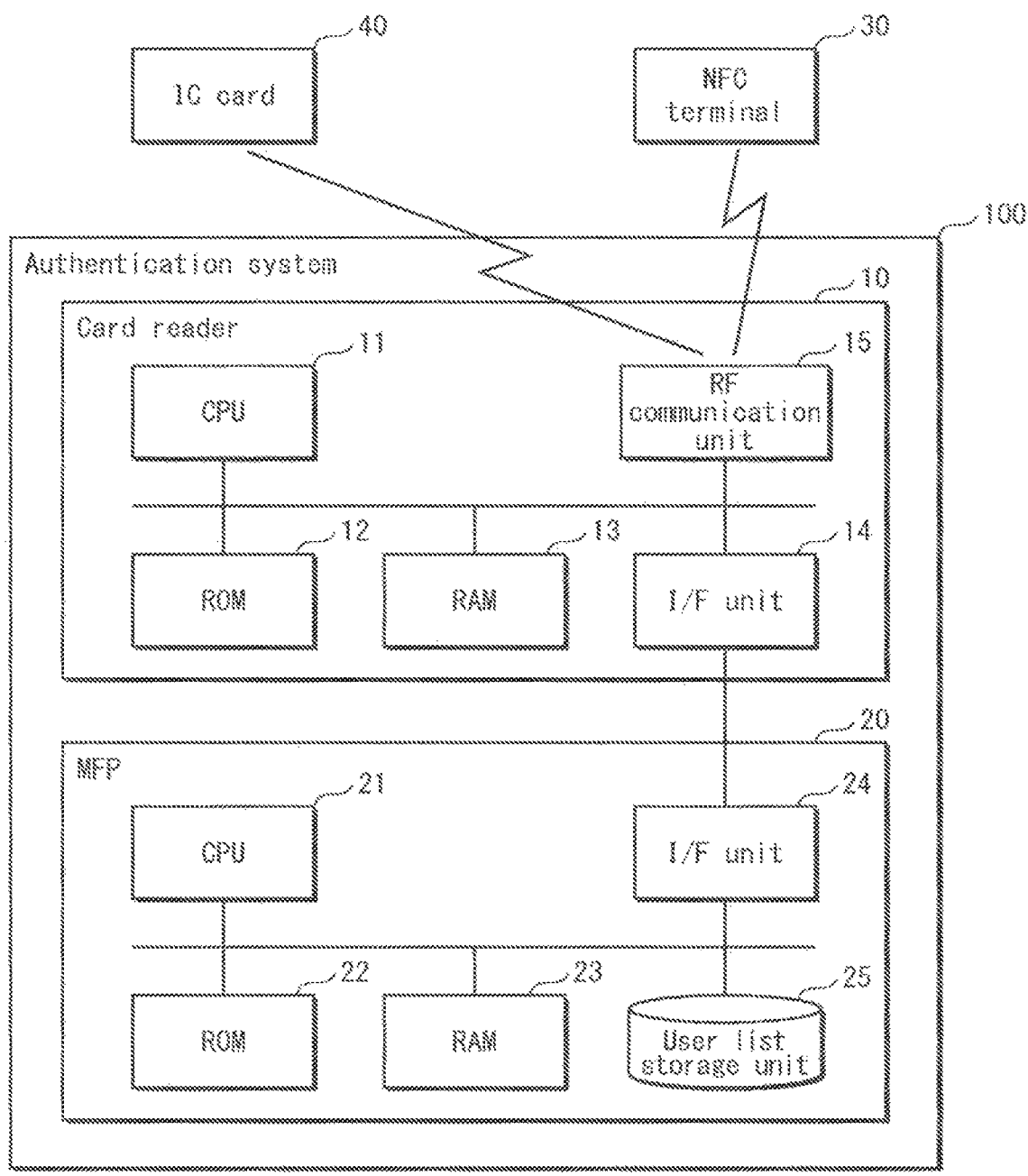
FIG. 1 shows the configuration of an authentication system relating to an embodiment of the present invention.

FIG. 1 shows the hardware configuration of an authentication system 100 relating to the present embodiment. The authentication system 100 includes a card reader 10 and a multifunction peripheral (MFP) 20. The authentication system 100 performs user authentication based on ID information read from an NFC terminal 30 and ID information of an IC card 40, and thus to manage the number of sheets printed in the MFP 20 for each user. The NFC terminal 30 and the IC card 40 are the first type of contactless communication terminal and the second type of contactless communication terminal, respectively, in the claims.

The NFC terminal 30 is a mobile terminal having a contactless communication function that is compliant with one of ISO/IEC 18092 and ISO/IEC 21481. The IC card 40 is an IC card having a contactless communication function that is compliant with one of ISO/IEC 14443 Type A, ISO/IEC 14443 Type B, and Felica. While the NFC terminal 30 is forward compatible with the IC card 40, the IC card 40 is not backward compatible with the NFC terminal 30.

The card reader 10 includes, as the hardware configuration relevant to an authentication function, a CPU 11, a ROM, 12, a RAM 13, an I/F unit 14, and an RF communication unit 15. The CPU 11 reads and executes a computer program recorded in the ROM 12, and thus to achieve part of functions of the authentication system 100.

The RF communication unit 15 is equivalent to the communication unit in the claims, and includes a transmission/reception circuit and an antenna. The transmission/reception circuit modulates transmission signals and demodulates reception signals. The antenna transmits and receives the signals as an electromagnetic field at an intensity compliant with the IC card standard. When the NFC terminal 30 and the IC Card 40 are held near the antenna, the RF communication unit 15 can communicate with these contactless communication terminals. In communication with contactless communication terminals, a read command N (equivalent to the first read command in the claims) for ID information attached to an NFC application in an HCE function and a read command I (equivalent to the second read command in the claims) for ID information compliant with the IC card standard are transmitted, and responses to the read commands are received.

In the present embodiment, the term "near" indicates being at a distance of approximate 10 cm, defined by ISO/IEC 14443, at which a so-called "proximity" contactless communication terminal and a card reader can communicate with each other.

The MFP 20 includes, as the hardware configuration relevant to the authentication function, a CPU 21, a ROM 22, a RAM 23, an I/F unit 24, and a user list storage unit 25. The CPU 21 reads and executes a computer program recorded in the ROM 22, and dins to achieve another part of the functions of the authentication system 100.

The user list storage unit 25 is equivalent to the storage in the claims, and is embodied by a storage such as an SSD and an HDD. The user list storage unit 25 stores therein a user list in which ID information and the like for use in user authentication are registered in association with each user.

The I/F unit 14 of the card reader 10 and the I/F unit 24 of the MFP 20 are each embodied by a universal serial bus (USB) connector, a USB controller, or the like. The I/F unit 14 and the I/F unit 24 are connected with each other via a USB cable, and perform data communication between the card reader 10 and the MFP 20. When the connection is lost between the I/F unit 14 and the I/F unit 24 due to unplugging of the USB cable, the MFP 20 suspends a printing function because the authentication system 100 cannot perform user authentication to manage the number of printed sheets for each user.

Figure 2:
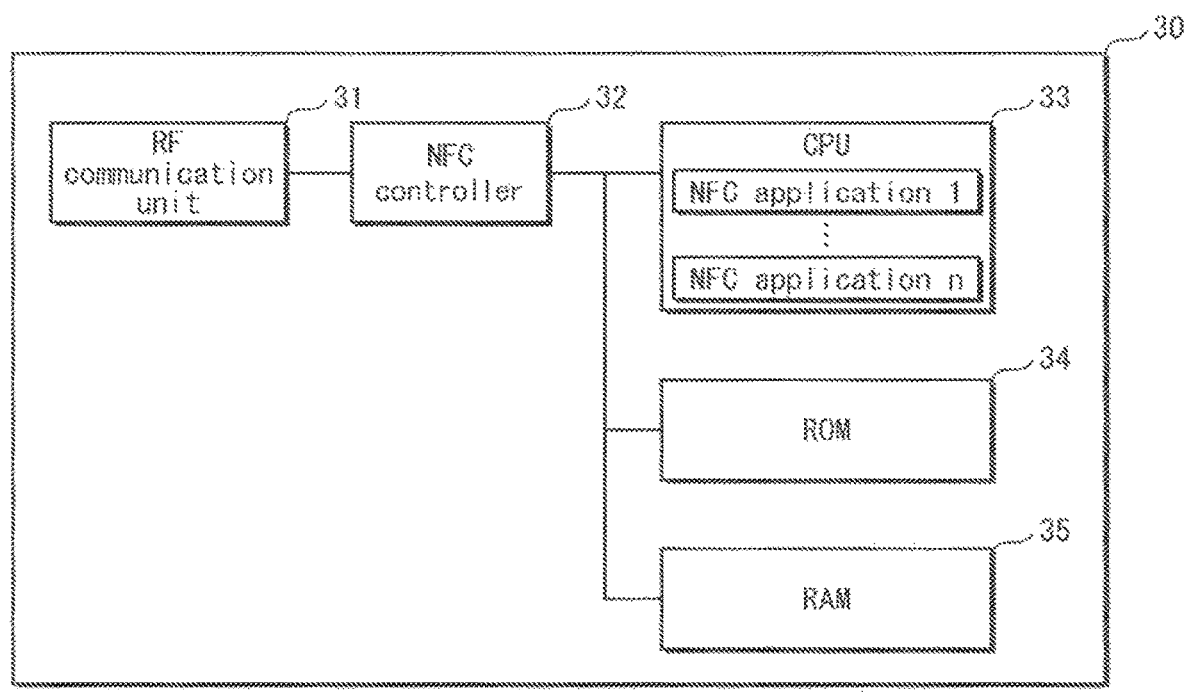
FIG. 2 is a block diagram showing the configuration of an NFC terminal.

FIG. 2 is a block diagram showing the configuration of the NFC terminal 30. The NFC terminal 30 includes an RF communication unit 31, an NFC controller 32, a CPU 33, a ROM 34, and a RAM 35.

The RF communication unit 31 includes a transmission/reception circuit and an antenna. The transmission/reception circuit modulates transmission signals and demodulates reception signals. The antenna transmits and receives signals as an electromagnetic field at an intensity compliant with the IC card standard. When the NFC terminal 30 is held near the antenna of the card reader 10, the RF communication unit 31 can communicate with the card reader 10.

The NFC controller 32 is a dedicated chip compliant with the NFC standard, and controls communication compliant with the IC card standard and the NFC standard via the RF communication unit 31. Also, the NFC controller 32 has ID information compliant with the IC card standard in order to emulate IC cards. Hereinafter, ID information compliant with the IC card standard is denoted as "IDc".

The CPU 33 functions as a host CPU of a mobile terminal. The CPU 33 executes an NFC application recorded in the ROM 34 based on an OS implementing the HCF function, and thus to emulate functions of IC cards. The CPU 33 can switch between NFC applications to be executed, to which different pieces of ID information are attached. Hereinafter, ID information attached to an NFC application is denoted as "IDn". This configuration allows the single NFC terminal 30 to emulate a plurality of IC cards.

Figure 3A:
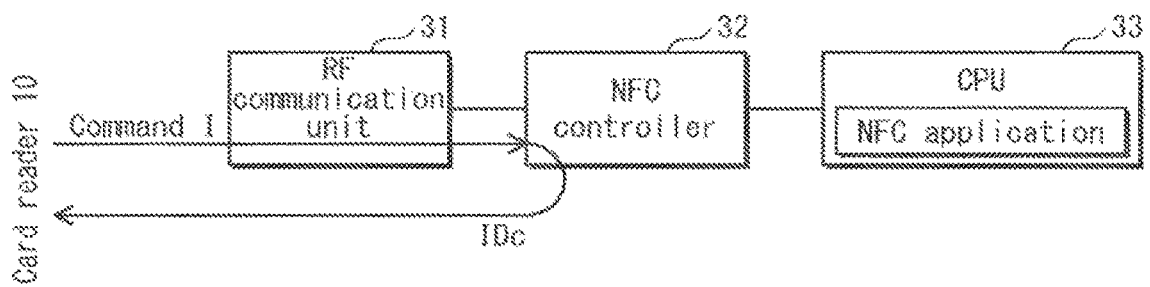
FIGS. 3A-3C each schematically show reaction of the NFC terminal to a read command, specifically

Explanation is given on a response that is returned in the case where the NFC terminal 30 receives a read command for ID information from the card reader 10. As shown in FIG. 3A, when the NFC terminal 30 receives the read command I for IDc, which is compliant with the IC card standard, the NFC controller 32 directly outputs IDc, and the IDc is returned as a response to the card reader 10.

Figure 3B:
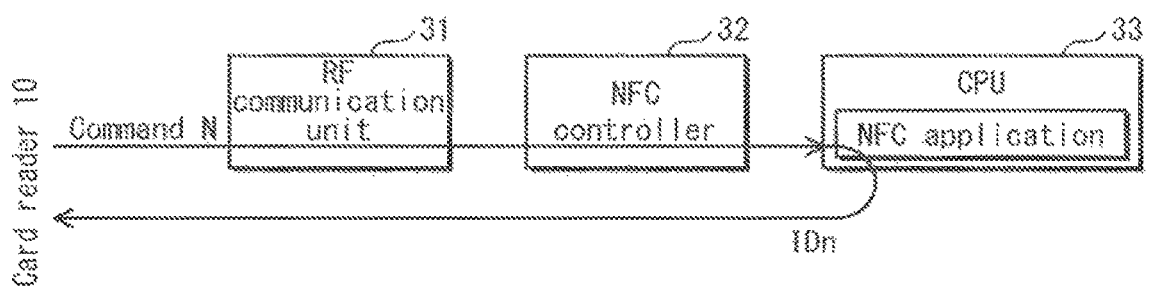
Figure 3C:
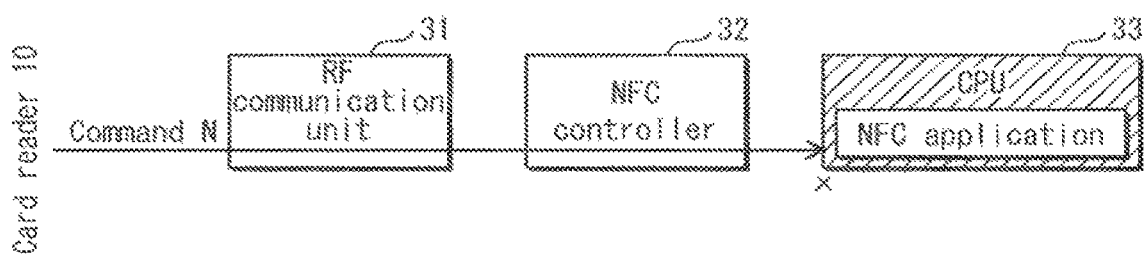

As shown in FIG. 3B, when the NFC terminal 30 receives a read command N for IDn, which is attached to an NFC application, the read command N is sent from the NFC controller 32 to the CPU 33. In response to this, the CPU 33 outputs IDn attached to an NFC application that the CPU 33 executes, and the IDn is returned as a response to the card reader 10. Note that the CPU 33 is not dedicated hardware for card emulation, and accordingly sometimes becomes busy due to its operations as a mobile terminal. For this reason, as shown in FIG. 3C, when a read command N is sent to the CPU 33 while the CPU 33 is busy, the CPU 33 cannot instantly respond to the read command N. In this case, the card reader 10, which waits for a response at extremely short time intervals such as 0.05 sec, fails in reading ID information.

This completes the explanation on the hardware configurations of the authentication system 100 and the NFC terminal 30 relating to the present embodiment.

<Functional Configuration>

Figures 4, 5:
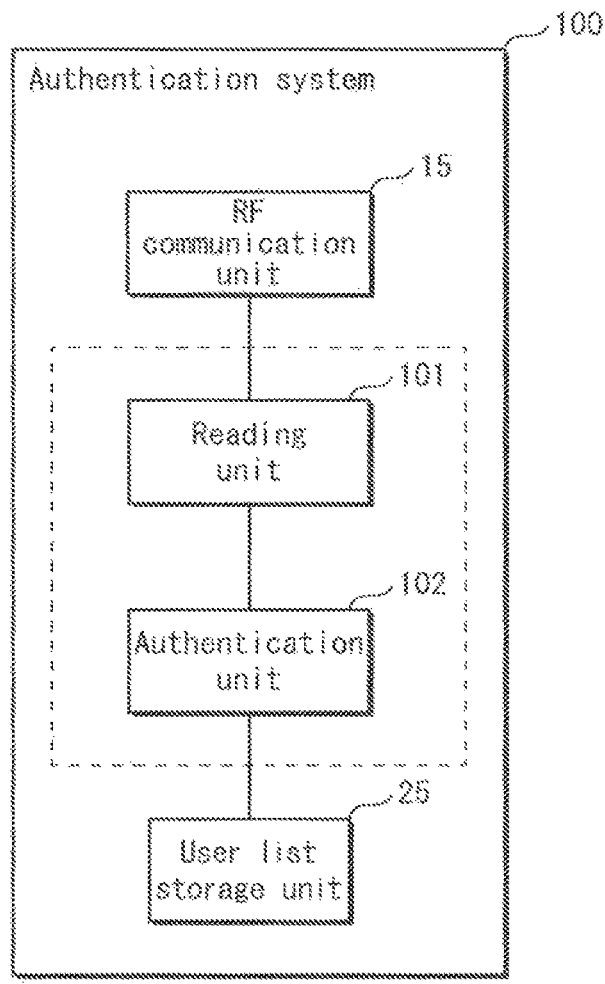
FIG. 4 shows the functional configuration of the authentication system.
FIG. 5 shows an example of a user list.

Next, explanation is given on the functions of the authentication system 100 achieved by the CPU 11 of the card reader 10 and the CPU 21 of the MFP 20 executing the computer programs. FIG. 4 shows the functional configuration of the authentication system 100.

A reading unit 101 is equivalent to the trading unit in the claims, and is implemented by the CPU 11 executing the computer program. The reading unit 101 communicates with a contactless communication terminal, which is held near the antenna, via the RF communication unit 15, and thus to identify the type of the contactless communication terminal and read ID information, and then outputs a pair of the type information and the ID information to an authentication unit 102. The details of operations of the reading unit 101 are described later as ID information reading processing.

The authentication unit 102 is equivalent to the authentication unit in the claims, and is implemented by the CPU 21 executing the computer program. The authentication unit 102 performs user authentication and user registration based on the pair of the type information of the contactless communication terminal and the ID Information, which is output by the reading unit 101.

In user authentication, the authentication unit 102 refers to the user list, which is stored in the user list storage unit 25, to authenticate a user who is associated with the pair of the type information of the contactless communication terminal and the ID information, which is output by the reading unit 101. The authenticated user is allowed to use the printing function of the MFP 20. FIG. 5 shows an example of the user list. The user list registers the user number, the type information of contactless communication terminal, and ID information in association with each user. The user list is also used for managing the number of sheets printed by the user, and further registers the number of primed sheets for each user.

In user registration, the authentication unit 102 adds a new user to the user list in association with the pair of the type information of the contactless communication terminal and the ID information, which is output by the reading unit 101.

This completes the explanation on the functional configuration of the authentication system 100 relating to the present embodiment.

<ID Information Reading Processing>

Next, explanation is given on ID information reading processing performed by the reading unit 101. FIGS. 6A-6G are timing charts showing communication of the card reader 10 in ID information reading processing. FIGS. 6A-6G each show, at the upper stage, a timing at which a command is issued by the card reader 10, and each show, at the lower stage, a timing at which a response is returned from a contactless communication terminal that is held near the antenna of the card reader 10. Also, white arrows in FIGS. 6A-6G each indicate a timing at which the contactless communication terminal is held near the antenna of the card reader 10.

1. Case Where No Response is Returned from Contactless Communication Terminal

In the case where no response is returned from the contactless communication terminal, the reading unit 101 repeatedly issues, at first time intervals (time intervals of one sec in the present embodiment), a read command N for IDn, which is attached to an NFC application, and a read command I for IDc, which is compliant with the IC card standard. Hereinafter, repetitive issuance of one read command N and one read command I at time intervals of one sec while no response is returned from the contactless communication terminal is referred to as "periodic issuance" or "periodically issue".

Figure 6A:
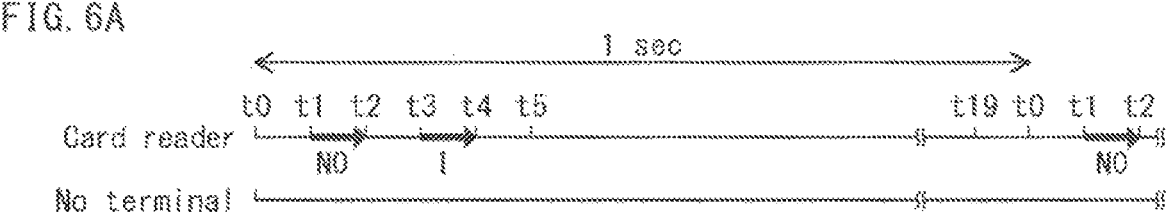
FIG. 6A is a timing chart showing a communication example of a card reader while a contactless communication terminal is not held near the card reader.

Specifically, as shown in FIG. 6A, the reading unit 101 divides one cycle into 20 time slots of t0-t19 for each 0.05 sec, and issues the read command N at time slot t1 and waits for a response from the contactless communication terminal at time slot t2. Here, the read command N is defined as including a preparation command N0 and a read execution command N1. The preparation command N0 designates an NFC application that is executed by the NFC terminal 30. After a response to the preparation command N0 is returned, the read execution command N1 requests for reading IDn attached to the designated NFC application. Accordingly, a command that the reading unit 10 actually issues at time slot t1 is only the preparation command N0. Since no response is returned from the contactless communication terminal at time slot t2, the reading unit 10 does not successively issue the read execution command N1, but issues the read command I at time slot t3. Since no response to the read command I is returned from the contactless communication terminal at time slot t4, the reading unit 10 stands by from time slot t5 till time slot t0 of the next cycle.

2. Case of Success in Reading IDn by Read Command N that is Periodically Issued

Figure 6B:
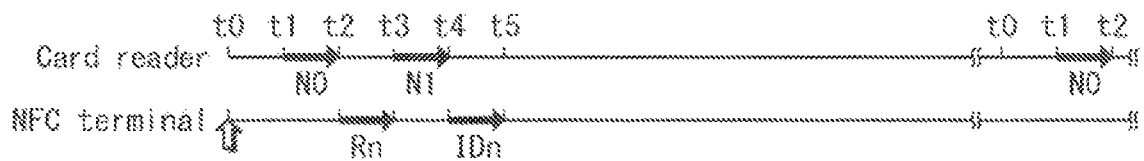
FIGS. 6B-6F are each a timing chart showing a communication example of the card reader and the NFC terminal.

Explanation is given on, as the case of success in reading ID information by the read command N that is periodically issues, the case where the NFC terminal 30 is held near the antenna at time slot t0, with reference to FIG. 6B.

When the reading unit 101 issues the preparation command N0 at time slot t1 while the NFC terminal 30 is held near the antenna, a response Rn is returned at time slot t2 from the NFC terminal 30, which has received the preparation command N0. In the ID information reading processing, in the case where the response Rn to the preparation command N0 is returned, the read execution command N1 is issued at a next time slot. In the communication example in FIG. 6B, the reading unit 101 issues the read execution command N1 at time slot t3. As a result, IDn attached to an NFC application which is designated by the preparation command N0 is returned at time slot t4 from the NFC terminal 30, which has received the read execution command N1.

When succeeding in reading the ID information in this way by the read command N which is periodically issued, the reading unit 101 outputs, to the authentication unit 102, the IDn reads as a response at time slot t4 and type information indicating that the type of the contactless communication terminal as a communication party is an NFC terminal. Then, the reading unit 101 does not periodically issue the read command I in this cycle, and stands by till time slot t0 of the next cycle.

3. Case of Failure in Reading IDn by Read Command N that is Periodically Issued and Success in Reading IDc by Read Command I that is Periodically Issued There are two cases of an example of failure in reading IDn by the read command N and success in reading IDc by the read command I in one-cycle periodic issuance. One is case A where the NFC terminal 30 is held near the antenna at time slot t2, and the other is case B where the IC card 40 is held near the antenna at any time slot.

In this way, in the case where no response to the read command N, which is periodically issued, is returned and IDc to the read command I, which is periodically issued at time slot t3, is returned at time slot t4, the reading unit 101 again issues the read command N at second time intervals (0.05 sec in the present embodiment) alter issuance of the read command I, which has been periodically issued and to which a response has been returned. This is in order to identify whether this case falls into either of the above two cases. Hereinafter, reissuance of the read command N following the read command I, which has been periodically issued and to which a response has been returned, within the same cycle as that in which the read command I has been issued is referred to as "additional issuance" or "additionally issue". Note that the read command N is actually issued as a preparation command N0 and a read execution command N1, and accordingly reissuance of these commands are also referred to as additional issuance.

Rather than waiting till after a read command N is periodically issued in the next cycle, a read command N' is additionally issued at short time intervals after issuance of the read command I to which the response is returned. This is because a user might separate the contactless communication terminal from the vicinity of the card reader 10 by the next cycle.

Figure 6C:
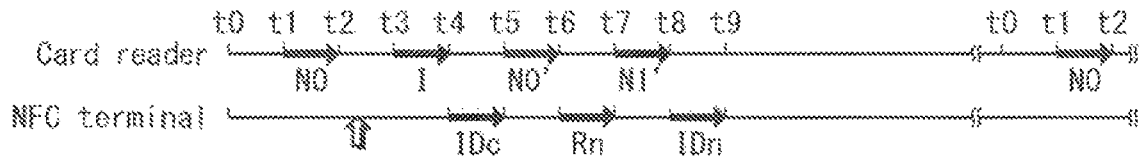

As shown in FIG. 6C, in the ease, for example, where the NFC terminal 30 is held near the antenna of the card reader 10 at time slot t2, the NFC terminal 30 cannot receive a preparation command N0, which is issued at time slot t1. Accordingly, the first response received from the NFC terminal 30 is a response to a read command I, which is issued at time slot t3. The reading wait 101 periodically issues a read command I at time slot t3, receives IDc as a response at time slot t4, and additionally issues a preparation command N0' at time slot t5. In this way, the preparation command N0' is additionally issued at short time intervals of 0.05 sec after periodic issuance of the read command I. Accordingly, the NFC terminal 30 is not separated from the vicinity of the card reader 10 yet, and returns a response Rn at time slot t6. Alter receiving the response Rn, the reading unit 101 additionally issues a read execution command N1' at time slot t7. As a result, IDn attached an NFC application which is designated by the preparation command N0' is returned at time slot t8 from the NFC terminal 30, which has received the read execution command NF.

When succeeding in reading the IDn by the read command N' in this way, the reading unit 101 outputs, to the authentication unit 102, the IDn read as a response at time slot t8 and type information indicating that the type of the contactless communication terminal as a communication party is an NFC terminal. Then, the reading unit 101 stands by till time slot t0 of the next cycle.

Figure 6D:
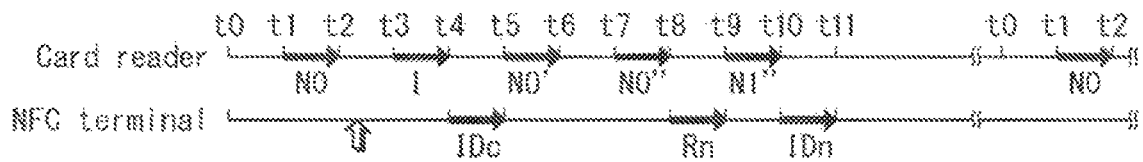
Figure 6E:
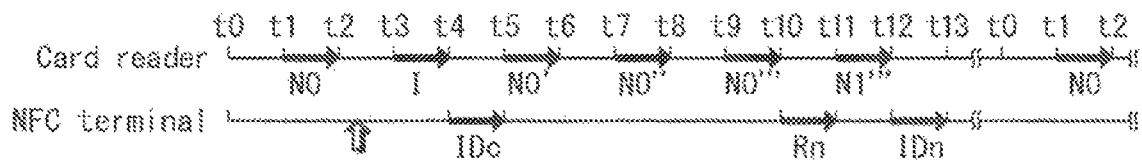

Note that, as explained with reference to FIG. 3C, even when the NFC terminal 30 is held near the antenna of the card reader 10, the NFC terminal 30 sometimes cannot return a response within the response-waiting time slot of 0.05 sec while the CPU 33 is busy. In such a case, neither response to the read command N, which is periodically issued, nor response to the read command N', which is additionally issued, is returned. Accordingly, the reading unit 101 successively repeats additional issuance of the read command N up to three times. As shown in FIGS. 6C-6E, in the case where the CPU 33 of the NFC terminal 30 gets out of the busy state and IDn as a response is returned till after the third additional issuance of the read command N is performed, the reading unit 101 immediately terminates the additional issuance, and outputs, to the authentication unit 102, the IDn read as the response and type information indicating that the type of the contactless communication terminal as a communication party is an NFC terminal. Then, the reading unit 101 stands by till the next cycle.

Figure 6F:
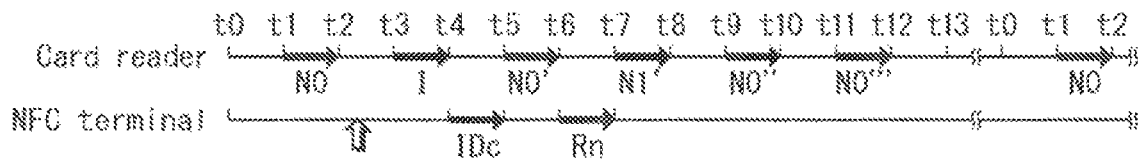

Note the following, case is considered as shown in FIG. 6F. The CFU 33 of the NFC terminal 30 temporarily gets out of the busy state, and a response Rn to a preparation command N0', which has been additionally issued at time slot t5, is returned at time slot t6. However, the CPU 33 then becomes busy again, and as a result the NFC terminal 30 cannot respond to a read execution command N1', which is additionally issued at time slot t7. In this way, in the case where the reading unit 101 can receive the response Rn to the preparation command N0 but cannot receive the IDn, the reading unit 101 stands by till the next cycle, without outputting, to the authentication unit 102, the IDc read at time slot t4 in response to the read command I, which has been issued at time slot t3.

Also, the timing when the CFU 33 temporarily gets out of the busy state is not limited to that in the example in FIG. 6F. The timing can come when any of the following commands is issued: a preparation command N0 which is periodically issues; a preparation command N0' which is additionally issued first; a preparation command N0" which is additionally issued second; and a preparation command N0'" which is additionally issued third. In view of this, also in the case where the reading unit 101 can receive a response Rn to at least one of the preparation command N0 which is periodically issued, the preparation command N0' which is additionally issued first, the preparation command N0″ which is additionally issued second, and the preparation, command N0‴ which is additionally issued third, and cannot receive IDn, the reading unit 101 stands by till the next cycle starts without outputting the IDc to the authentication unit 102.

Figure 6G:
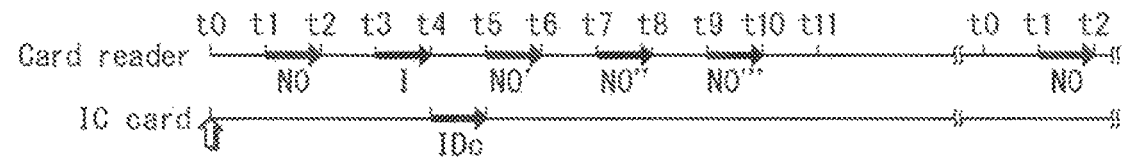
FIG. 6G is a timing chart showing a communication example of the card reader and an IC card.

In contrast, as shown in FIG. 6G, in the case where a contactless communication terminal that is held near the antenna is the card reader 10, the IC card 40 returns IDc at time slot t4 as a response to a read command I, which has been issued at time slot t3. Accordingly, after reading the IDc, the reading unit 101 additionally issues a preparation command N0 three times at and after time slot t5. However, since a communication party is the IC card 40, no response is returned to any of the preparation commands N0 which are additionally issued.

In this way, in the case where the reading unit 101 can read the IDc as a response to the read command I which is periodically issued, and can receive no response to any of the preparation command N0 which is periodically issued and the preparation commands N0′, N0″, and N0‴ which are additionally issued, the reading unit 101 outputs, to the authentication unit 102, the IDc read as a response at time slot t4 and type information indicating that the type of the contactless communication terminal as the communication party is an IC card. Then, the reading unit 101 stands by till time slot t0 of the next cycle.

This completes the explanation on the ID information reading processing.

<Details of Operations>

Next, explanation is given on the details of the operations of the authentication system 100.

1. Operations of Reading Unit 101

Figure 7:
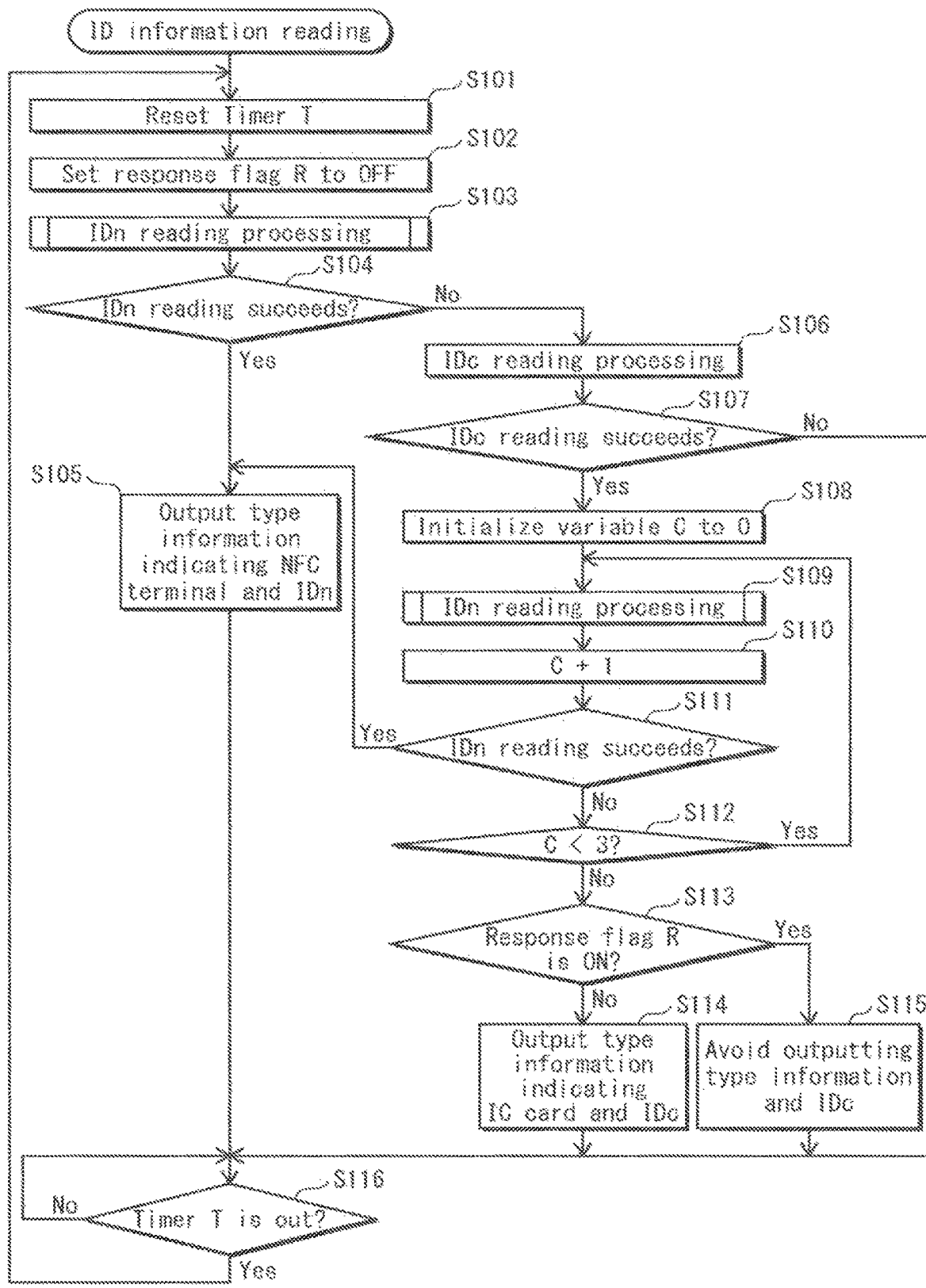
FIG. 7 is a flow chart showing ID information reading processing performed by a reading unit.

First, the details of the operations of the reading unit 101 are explained. FIG. 7 is a flow chart showing the operations relating to ID information reading processing performed by the reading unit 101.

In the ID information reading processing, the reading unit 101 first sets a standby period S1 (for example, one sec) to a timer function T (Step S101), and then sets a response flag R to OFF (Step S102). The timer function T is a timer function for counting a period elapsed after settings of a standby period, and outputting a timeout message when the set standby period elapses. In the authentication system relating to the present embodiment, the polling cycle of a contactless communication terminal is set to one sec with use of the timer function T. The response flag R is a flag that manages whether or not a response has been returned from the NFC terminal 30.

After setting the timer function T and the response flag R, the reading unit 101 performs IDn reading processing (Step S103). The IDn reading processing is processing of trying to read ID information o an NFC application from the NFC terminal 30 by issuing a read command N for reading the ID information and receiving a response to the read command N. The detailed procedure of the IDn reading processing is described later. When the NFC terminal 30 is held near the card reader 10, the reading unit 101 performs IDn reading processing, and thus to acquire IDn, which is ID information attached to an NFC application, from the NFC terminal 30. Note that in the case where a response is incomplete for example because the CPU 33 of the NFC terminal 30 is busy, the reading unit 101 sometimes fails in acquiring the IDn even when the NFC terminal 30 is held near the card reader 10. Even when acquisition of the IDn has failed, the response flag R is set to ON during the process of the IDn reading processing as long as any communication with the NFC terminal 30 has succeeded.

After performing the IDn reading processing, the reading unit 101 judges whether or not reading of the IDn has succeeded (Step S104). When judging that reading of the IDn has succeeded (Step S104: Yes), the reading unit 101 outputs, to the authentication unit 102, the read IDn and type information indicating that the type of the contactless communication terminal as the communication party is an NFC terminal (Step S105).

In Step S104, when judging that reading of the IDn has failed (Step S104: No), the reading unit 101 performs IDc reading processing (Step S106). The IDc reading processing is processing of trying to read ID information from the NFC terminal 30 and the IC card 40 by issuing a read command I compliant with the IC card standard and receiving a response to the read command I. When the NFC terminal 30 or the IC card 40 is held near the card reader 10, the reading unit 101 performs IDc reading processing, and thus to acquire IDc, which is ID information compliant with the IC card standard.

After performing the IDc reading processing, the reading unit 101 judges whether or not reading of the IDc has succeeded (Step S107). When judging that reading of the IDc has succeeded (Step S107: Yes), the reading unit 101 initializes a variable C to zero (Step S108). The variable C is a variable for managing the additional issuance number of times of the read command N. Then, the reading unit 101 performs loop processing in Steps S109-S112 to additionally issue the read command N.

The reading unit 101 additionally issues the read command N by performing IDn reading processing (Step S109) and incrementing the variable C by one (Step S110). Then the reading unit 101 judges whether or not reading of the IDn in the IDn reading processing in Step S109 has succeeded (Step S111). When judging that reading of the IDn has succeeded (Step S111: Yes), the reading unit 101 breaks out of the loop processing, and outputs, to the authentication unit 102, the read IDn and type information indicating that the type of the contactless communication terminal is an NFC terminal (Step S105).

When judging that reading of the IDn in the IDn reading processing in Step S109 has failed (Step S111: No), the reading unit 101 judges whether or not the variable C is less than three, that is, whether or not the additional issuance number of times of the read command N is less than three (Step S112).

When judging that the additional issuance number of times of the read command N is less than three (Step S112: Yes), the reading unit 101 repeats the loop processing in Steps S109-S112 from the IDn reading processing in Step S109.

When judging that the additional issuance number of times of the read command N reaches three (Step S112: No), the rending unit 101 judges whether or not the response flag R is set to ON (Step S113). Even when reading of the IDn in the IDn reading processing in each of Steps S103 and S109 has failed, the response flag R is set to ON during the IDn reading processing as long as a response to the preparation command N0 issued during the IDn reading processing has been returned from the NFC terminal 30.

In Step S113, when judging that the response flag R is set to OFF (Step S113: No), the reading unit 101 outputs, to the authentication unit 102, type information indicating that the type of the contactless communication terminal is an IC card and the IDc read in the IDc reading processing in Step S106 (Step S114).

In Step S113, when judging that the response flag R is set to ON (Step S113: Yes), the reading unit 101 avoids outputting the type information and the ID information (Step S115).

In the processing procedure so far, the reading unit 101 outputs a pair of type information and ID information in Steps S105 or S114, or avoids outputting the pair in Step S115. After outputting or avoiding outputting the pair of the type information and the ID information in any of these steps, the reading unit 101 stands by till after the timer function T outputs the timeout message (Step S116: No). When the timeout message is output (Step S116: Yes), the reading unit 101 returns to Step S101 to start processing in the next cycle.

This completes the explanation on the operations of the ID information reading processing performed by the reading unit 101.

Figure 8:
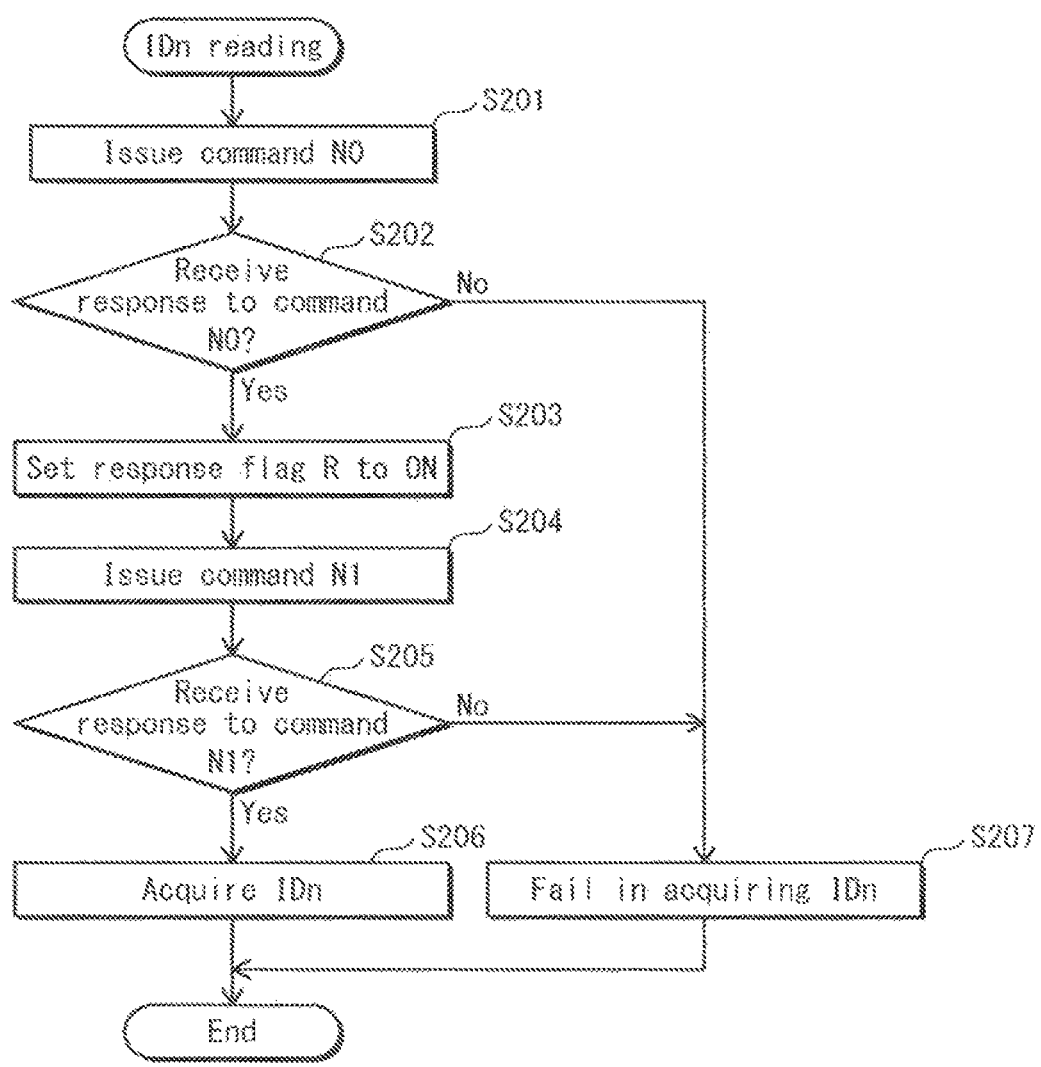
FIG. 8 is a flow chart showing IDn reading processing.

Next, explanation is given on the details of the IDn reading processing performed in Steps S103 and S109 in FIG. 7. FIG. 8 is a flow chart showing the operations relating to the IDn reading processing.

In the IDn reading processing, the reading unit 101 tries to read ID information from the NFC terminal 30 by issuing a read command N compliant with the NFC standard and receiving a response to the read command N.

Specifically, the reading unit 101 first instructs the RF communication unit 15 to issue a preparation command N0 (Step S301). When the RF communication unit 15 receives from the NFC terminal 30 a response Rn to the preparation command N0 (Step S202: Yes), the reading unit 101 sets the response flag R to ON (Step S203), and then instructs the RF communication unit 15 to issue a read execution command N1 (Step S204).

When the RF communication unit 15 receives IDn as a response to the read execution command N1 from the NFC terminal 30 (Step S205), the reading unit 101 acquires the IDn as a response from the NFC terminal 30 (Step S206), and ends the IDn reading processing.

When the RF communication unit 15 does not receive the response Rn to the preparation command N0 (Step S202: No), or when the RF communication unit 15 does not receive the IDn as a response to the read execution command N (Step S205: No), the reading unit 101 returns an error message indicating failure in acquiring the IDn (Step S207), and ends the IDn reading processing.

This completes the operations of the IDn reading processing.

2. Operations of Authentication Unit 102

Next, explanation is given on the details of the operations of the authentication unit 102. FIG. 9 is a flow chart showing the operations relating to authentication/registration processing performed by the authentication unit 102.

In the authentication/registration processing, the authentication unit 102 first judges which one of an authentication mode and a registration mode has been selected (Step S301). The mode is selected through the user's operation via an input unit such as operation buttons and a touch panel included in the MFP 20.

In Step S301, when judging that the authentication mode has been selected (Step S301: Yes), the authentication unit 102 stands by till after the reading unit 101 outputs a pair of type information and ID information (Step S302: No). When acquiring the type information and the ID information output by the reading unit 101 (Step S302: Yes), the authentication unit 102 searches the user list stored in the user list storage unit 25 for the acquired pair of the type information and the ID information (Step S303).

When the acquired pair of the type information and the ID information is registered in the user list (Step S304: Yes), the authentication unit 102 authenticates a user having a user number that is associated with the pair (Step S305), and thus authorize the user to perform a printing operation, and ends the operations in the authentication mode. When the acquired pair of type information and ID information is not registered in the user list (Step S304: No), the authentication unit 102 performs error handling of user authentication (Step S306), and ends the operations in the authentication mode. In the error handling of user authentication, the authentication unit 102 may notify of failure in user authentication by displaying an error message on a display included in the MFP 20 or by outputting an audio through a speaker. Alternatively, the authentication unit 102 may terminate the processing without any explicit error notification.

In Step S301, when judging that the registration mode has been selected (Step S301: No), the authentication unit 102 acquired a user number input by a user (Step S307). The user number is input for example through the user's operation via the input unit such as the operation buttons and the touch panel included in the MFP 20. After acquiring the user number, the authentication unit 102 stands by till after the reading unit 101 outputs a pair of type information and ID information (Step S308: No). When acquiring the pair of the type information and the ID Information output by the reading unit 101 (Step S308: Yes), the authentication unit 102 searches the user list stored in the user list storage unit 25 for the acquired pair of type information and ID information (Step S309).

When the acquired pair of type information and ID information is not registered in the user list (Step S310: No), the authentication unit 102 registers the pair in the user list in association with the user number acquired in Step S307 (Step S311), and ends the operations in the registration mode.

When the acquired pair of type information and ID information is registered in the user list (Step S310: Yes), the authentication unit 102 performs error handling of user registration (Step S306), and ends the operations in the registration mode. In the error handling of user registration, the authentication unit 102 may notify of failure in user registration by displaying an error message on the display included in the MFP 20 or by outputting an audio through the speaker. Such an error message should preferably be displayed toy using texts or the like explicitly indicating that the contactless communication terminal has been registered. Alternatively, in the error handling of user registration, the authentication unit 102 may authenticate a user by using a user number that is registered in the user list in association with a pair of type information and ID information, and thus to authorize the user to perform a printing operation.

This completes the operations of the authentication/registration processing performed by the authentication unit 102.

SUMMARY

As described above, the authentication system 100 relating to the present embodiment additionally issues a read command N to the NFC terminal 30, which has responded to a read command I, and thus to read ID information attached to an NFC application. According to the authentication system 100, therefore, even in the case where the NFC terminal 30 is held near the antenna after a read command N is periodically issued and before a read command I is issued, it is possible to perform user authentication without misidentifying the type of the NFC terminal 30 as an IC card.

Also, the authentication system 100 relating to the present embodiment fails in reading ID information attached to an NFC application in response to a read command N, which is additionally issued, the authentication system 100 outputs ID information read in response to a read command I, which is periodically issued, and type information indicating that the type of a communication party is an IC card. Therefore, the authentication system 100 relating to the present embodiment is utilizable for authenticating both users of NFC terminals and users of IC cards.

Also, the authentication system 100 relating to the present embodiment additionally issues a read command N up to three times successively till a response is returned from a contactless communication terminal. In the case where no response to any of all the three read commands N is returned, the authentication system 100 outputs ID information read in response to a read command I, which is periodically issued, and type information indicating that the type of a communication party is an IC card. Accordingly, in the case where the NFC terminal 30 cannot respond to a read command N because the CPU 33 thereof is busy, the authentication system 100 can wait for the CPU 33 to get out of the busy state while the read command N is additionally issued np to three times. According to the authentication system 100 relating to the present embodiment, therefore, it is possible to reduce a possibility that the type of a contactless communication terminal is misidentified because of the CPU 33 of the NFC terminal 30 being busy. This exhibits an effect of increasing the success rate of user authentication.

Also, in the case where the authentication system 100 relating to the present embodiment cannot read ID information of an NFC application in response to a read command N, which is additionally issued, but can receive a response to any of preparation commands N0, which are periodically issued and additionally issued, the authentication system 100 avoids outputting ID information of an IC card read in response to a read command I. According to the authentication system 100 relating to the present embodiment, therefore, it is possible to suppress misidentification of the type of a contactless communication terminal, thereby avoiding unnecessary execution of error handling of user authentication.

Also, the authentication system 100 relating to the present embodiment periodically issues a read command N and a read command I at time intervals of one sec, and additionally issues the read command N at time intervals of 0.05 sec after issuance of the read command I. According to the authentication system 100 relating to the present embodiment, therefore, when ID information of an IC card is read in response to the read command I, it is possible to promptly identify the type of a contactless communication terminal as a communication party without waiting for periodic issuance of the read command N in the next cycle. Therefore, it is possible to reduce a possibility that the type of the contactless communication terminal as the communication party is misidentified as an IC card due to that a user separates the NFC terminal from the vicinity of the antenna of the card reader 10 after the ID information is read in response to the read command I and before the read command N is issued next.

Also, in the case where a pair of type information of a contactless communication terminal and ID information output by the reading unit 101 is not registered in the user list, the authentication system 100 relating to the present embodiment, registers the pair of the type information of the contactless communication terminal and the ID information in the user list in association with a new user. This processing allows registration of new users with a simple procedure.

Also, there have been widespread mobile terminals, as the NFC terminal 30 in the present embodiment, having the contactless communication function, which are compliant with one of ISO/IEC 18092 and ISO/IEC 21481, and IC cards, as the IC card 40 in the present embodiment, having the contactless communication function, which are compliant with one of ISO/IEC 14443 Type A, ISO/IEC 14443Type B, and Felica. According to the authentication system 100 relating to the present embodiment, authentication is performed with use of such contactless communication terminals which are widespread and are likely to have already been owned by users. This promises reduction in the initial, cost for introducing the authentication system 100 relating to the present embodiment.

Also, as described above, the computer program that controls the authentication system 100 relating to the embodiment can cause the CPU to operate to additionally issue a read command N to the NFC terminal 30, which has responded to a read command I, and thus to read ID information attached to an NFC application. According to the computer programs, therefore, even in the case where the NFC terminal 30 is held near the antenna after the read command N is periodically issued and before the read command I is periodically issued, it is possible to control the authentication system 100 to perform user authentication without misidentifying the type of the NFC terminal 30 as an IC card.

Also, as described above, the card reader 10, which is equivalent to the reader in the claims, in the authentication system 100 relating to the embodiment additionally issues a read command N to the NFC terminal 30, which has responded to a read command I, and thus to read ID information attached to an NFC application. According to the card reader 10, therefore, even in the case where the NFC terminal 30 is held near the antenna after the read command N is periodically issued and before the read command I is periodically issued, it is possible to acquire the ID information without misidentifying the type of the NFC terminal 30 as an IC card.

(Supplement)

Although the present invention has been explained based on the above embodiment, the present invention is of course not limited to the above embodiment. The present invention includes the following modifications.

(1) The present invention may be a computer program including program codes for causing a computer to operate in accordance with the processing procedure shown in the flow charts explained in the above embodiment. Alternatively, the present invention may be a digital signal composed of the computer program.

Furthermore, the present invention may be a computer-readable recording medium such as a flexible disk, a hard disk, a CD-ROM, an MO, a DVD, a DVD-ROM, a DVD-RAM, a Blu-ray Disc (BD), and a semiconductor memory, which records therein the computer program or the digital signal.

Also, the present invention may be the computer program or the digital, signal transmitted via an electric communication network, a wireless or wired communication network, a network such as the Internet, or the like.

Also, the present invention may be implemented by another independent computer system, by transmitting the computer program or the digital signal each recorded in the recording medium to the other computer system, or by transmitting the computer program or the digital signal to the other computer system via the network, or the like.

(2) In the above embodiment, the functions of the reading unit 101 are achieved by the CPU 11 of the card reader 10 executing programs, and the functions of the authentication unit 102 are achieved by the CPU 21 of the MFP 20 executing programs. However, the respective functions of the reading unit and the authentication unit in the authentication system relating to the present invention do not necessarily need to be implemented on different devices.

For example, the respective functions of the reading unit 101 and the authentication unit 102, which are surrounded by dashed line in FIG. 4, may be achieved by the CPU 11 of the card reader 10 executing programs. In this case, the card reader 10 should notify the MFP 20 of only results of user authentication.

Alternatively, the respective functions of the reading unit 101 and the authentication unit 102 may be achieved by the CPU 21 of the MFP 20 executing programs. In this case, the card reader 10 should output data, which is transmitted and received by the RF communication unit 15, directly to the MFP 20.

(3) In the above embodiment, the authentication system 100 includes the card reader 10 and the MFP 20. Alternatively, the authentication system relating to the present invention may include other device instead of these devices.

For example, a device that communicates with contactless communication terminals may be a card reader-writer having a writing function in addition to a reading function.

A device that uses authentication results is not limited to an MFP, and alternatively may be a device such as a PC used by a plurality of persons and a bathroom scale for domestic use. Further, the authentication system relating to the present invention may be composed only of a device, which uses authentication results, into which a card reader function is incorporated.

(4) The length of the cycle for periodically issuing a pair of the read command N for an NFC terminal and the read command I for an IC card is not limited to one sec. Alternatively, the cycle may be arbitrarily set to for example 0.5 sec, 1.5 sec, or the like. Note that the too long cycle of periodic issuance might degrade the usability due to delay of response. In contrast, the too short cycle of periodic issuance might cause excessive occupation of the CPU resources of the authentication system, or cause excessively early consumption of the battery in the case where the card reader is battery-driven. For this reason, the cycle of periodic issuance should preferably be set to the length to an extent that these problems do not occur.

Further, the length of time slot at which each of the read commands N and I is issued and a response thereto is being waited for, and so on is also not limited to 0.05 sec, and may be arbitrarily set in accordance with the length of the cycle of periodic issuance.

(5) In the above embodiment, when periodic issuance is performed by first issuing the read command N, and then issuing the read command. However, the order of periodic issuing the read commands is not limited to this order. The read command I may be first issued, and the read command N may be then issued.

(6) In the above embodiment, the read command N for reading ID information of an NFC application is additionally issued up to three times following the read command I issued for reading ID information of an IC card. However, the additional issuance maximum number of times of the read command N is not limited to three. The read command N may be additionally issued any number of times till the next cycle, such as once, twice, four times, and five times.

(7) In the above embodiment, the read command N as the first read command is achieved by issuing the preparation command N0 for designating an NFC application and the read execution command N1. However, the first read command may be implemented by a different command configuration. For example, the first read command may be achieved by issuing, prior to issuance of the read execution command, a plurality of preparation commands such as a command for designating an application, a command for exchanging an encryption key and a command for requesting for access to a file storing ID information. Also, the second mad command may be achieved by issuing a plurality of commands, like the first read command.

(8) Contactless communication terminals that are communication parties of the authentication system relating to the present invention are not limited to the NFC terminal 30 and the IC card 40, which are used in the above embodiment, and alternatively may be other devices. For example, in the case where a mobile terminal compliant with the NFC standard is used as the first the type of contactless communication terminal, an IC tag or the like compliant with the standard ISO/IEC 15693 may be used as the second the type of contactless communication terminal.

Alternatively, a contactless communication terminal that is different from a mobile terminal compliant with the NFC standard may be used as the first the type of contactless communication terminal, and another type of contactless communication terminal that is compliant with another contactless communication standard that is forward compatible with the different contactless communication terminal may be used as the second the type of contactless communication terminal.

The present invention is utilizable as an authentication system for use in management of jobs executed by an MFP.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

The invention claimed is:

1. An authentication system that performs authentication based on authentication information read from a contactless communication terminal by near field communication, the authentication system comprising:
   a processor that repeatedly issues a first command and a second command, the first command being a command to which a first type of contactless communication terminal responds, the second command being a command to which both the first type of contactless communication terminal and a second type of contactless communication terminal respond;
   a first receiver that receives a response to the first command;
   a second receiver that receives a response to the second command;
   an authenticator that, when the response to the first command and the response to the second command are both received, performs authentication based on authentication information acquired from the response to the first command; and
   a controller that judges, when the response to the second command is received with no response to the first command received and then the first command is issued and a response to the first command is received, that the response to the first command and the response to the second command are both received.

2. The authentication system of claim 1, wherein the response to the first command is received from an application operating within the contactless communication terminal via a communication controller included in the contactless communication terminal.

3. The authentication system of claim 1, wherein
the first command is a command for performing communication compliant with a first communication standard with an application operating within the contactless communication terminal via a communication controller included in the contactless communication terminal, and
the second command is a command for performing communication compliant with a second communication standard with the communication controller, the second communication standard being different from the first communication standard.

4. An authentication system that performs authentication based on authentication information read from a contactless communication terminal by near field communication, the authentication system comprising:
a first transmitter that performs communication compliant with a first communication standard with an application operating within the contactless communication terminal via a communication controller included in the contactless communication terminal, thereby to acquire data output by the application;
a second transmitter that performs communication compliant with a second communication standard with the communication controller, thereby to acquire data output by the communication controller, the second communication standard being different from the first communication standard;
an authenticator that, when the communication by the first transmitter and the communication by the second transmitter are both possible, performs authentication based on the data acquired through the communication by the first transmitter; and
a controller that judges, when the response to the second command is received with no response to the first command received and then the first command is issued and a response to the first command is received, that the response to the first command and the response to the second command are both received.

5. A reader that reads authentication information from a contactless communication terminal by near field communication, the reader comprising:
a processor that repeatedly issues a first command and a second command, the first command being a command to which a first type of contactless communication terminal responds, the second command being a command to which both the first type of contactless communication terminal and a second type of contactless communication terminal respond;
a first receiver that receives a response to the first command;
a second receiver that receives a response to the second command; and
the processor outputs, when the response to the first command and the response to the second command are both received, authentication information acquired from the response to the first command to an authenticators;

a controller that judges, when the response to the second command is received with no response to the first command received and then the first command is issued and a response to the first command is received, that the response to the first command and the response to the second command are both received.

6. A reader that reads authentication information from a contactless communication terminal by near field communication, the reader comprising:
a first transmitter that performs communication compliant with a first communication standard with an application operating within the contactless communication terminal via a communication controller included in the contactless communication terminal, thereby to acquire data output by the application;
a second transmitter that performs communication compliant with a second communication standard with the communication controller, thereby to acquire data output by the communication controller;
a processor, when the communication by the first transmitter and the communication by the second transmitter are both possible, outputs the data acquired through the communication by the first transmitter to an authenticator; and
a controller that judges, when the response to the second command is received with no response to the first command received and then the first command is issued and a response to the first command is received, that the response to the first command and the response to the second command are both received.

7. A non-transitory computer-readable recording medium that records therein a computer program for reading authentication information from a contactless communication terminal by near field communication, the computer program causing a computer to execute:
a command issuance step of repeatedly issuing a first command and a second command, the first command being a command to which a first type of contactless communication terminal responds, the second command being a command to which both the first type of contactless communication terminal and the second type of contactless communication terminal respond;
a first reception step of receiving a response to the first command;
a second reception step of receiving a response to the second command;
an output step of, when the response to the first command and the response to the second command are both received, outputting authentication information acquired from the response to the first command to an authentication step; and
the authentication step comprising, when the response to the second command is received with no response to the first command received and then the first command is issued and a response to the first command is received, determining that the response to the first command and the response to the second command are both received.

8. A non-transitory computer-readable recording medium that records therein a computer program for reading authentication information from a contactless communication terminal by near field communication, the computer program causing a computer to execute:
a first communication control step of performing communication compliant with a first communication standard with an application operating within the contactless communication terminal via a communication controller included in the contactless communication terminal, thereby to acquire data output by the application;

a second communication control step of performing communication compliant with a second communication standard with the communication controller, thereby to acquire data output by the communication controller, the second communication standard being different than the first communication standard;

an output step of, when the communication by the first communication control step and the communication by the second communication control step are both possible, outputting the data acquired through the communication by the first communication control step to an authentication step; and the authentication step comprising, when the response to the second command is received with no response to the first command received and then the first command is issued and a response to the first command is received, determining that the response to the first command and the response to the second command are both received.

\* \* \* \* \*